United States Patent [19]

Melcher et al.

[11] Patent Number: 5,058,692
[45] Date of Patent: Oct. 22, 1991

[54] BALANCE WITH MOTOR-DRIVEN WIND GUARD

[75] Inventors: Franz-Josef Melcher, Hardegsen; Christian Oldendorf; Dieter Berthel, both of Göttingen, all of Fed. Rep. of Germany

[73] Assignee: Sartorius AG, Göttingen, Fed. Rep. of Germany

[21] Appl. No.: 539,268

[22] Filed: Jun. 18, 1990

[30] Foreign Application Priority Data

Jun. 19, 1989 [DE] Fed. Rep. of Germany ....... 3919870

[51] Int. Cl.$^5$ ...................... G01G 23/18; G01G 21/28
[52] U.S. Cl. ..................................... 177/181; 177/238
[58] Field of Search ................................ 177/181, 238

[56] References Cited

U.S. PATENT DOCUMENTS

| 4,700,793 | 10/1987 | Lüchinger | 177/181 |
| 4,789,034 | 12/1988 | Lüchinger et al. | 177/181 |
| 4,798,250 | 1/1989 | Knothe et al. | 177/181 |

Primary Examiner—George H. Miller, Jr.
Attorney, Agent, or Firm—Eric P. Schellin

[57] ABSTRACT

A balance with a wind guard moved by a motor whereby the position of movable walls of the guard are monitored by a sensor. An electronic memory is provided for the desired end position of the movable wall elements. The desired end position of the removable walls can be stored in this memory in a learning phase and when the walls are opened by the motor, they are opened only up to a preselected position. This minimizes the time for opening and closing the weighing area and diminishes exposure to air turbulence within the weighing area.

12 Claims, 4 Drawing Sheets

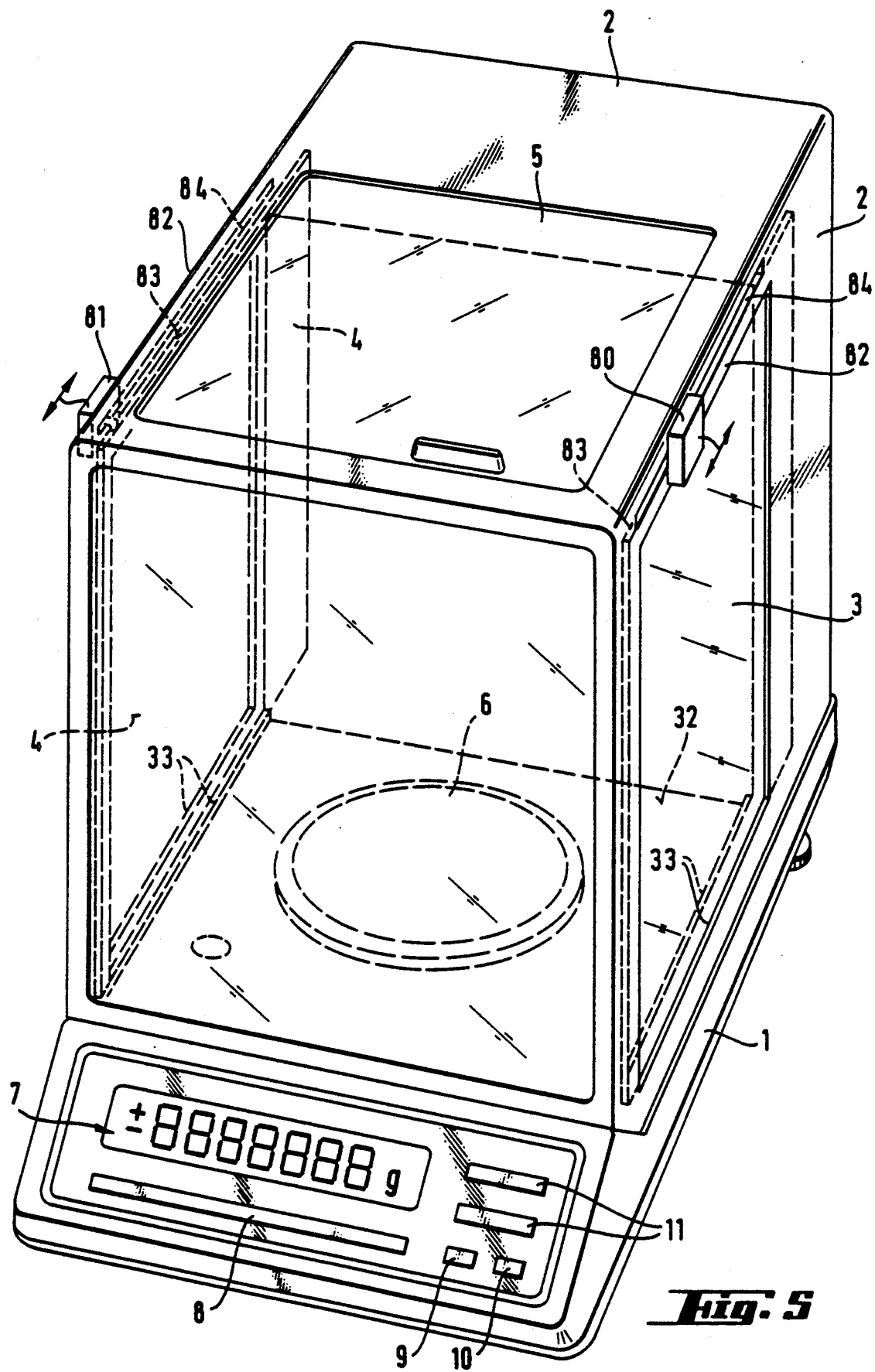

BALANCE WITH MOTOR-DRIVEN WIND GUARD

BACKGROUND OF THE INVENTION

The invention relates to a balance with a balance scale, with a weighing area which surrounds this balance scale on all sides and which can be opened and closed at least one position by shifting a movable wall element, with a drive motor for shifting the movable wall element and with control electronics for the drive motor.

Balances of this type are generally known. For example, DE-OS 37 41 313 describes such a balance which comprises a cylindrical wind guard, and EP 0 234 008 describes a balance with a boxlike wind guard.

A disadvantage of these known balances is the fact that the time required for a complete opening and closing of the weighing area by the motor is relatively long and that additional time elapses until the air turbulence in the weighing area has completely subsided after the closing of the wind guard.

The invention therefore has the object of designing a balance of the initially mentioned type in such a manner that the opening and closing of the weighing area does not prolong the weighing time and there is diminished subsequent subsidence or air turbulence.

SUMMARY OF THE INVENTION

The invention solves this problem in that a sensor monitors the position of the movable wall element; the output signal of the sensor is fed to a control electronics for the drive motor and storage means are present in which a desired end position for the movable wall element is stored.

This design of the invention thus makes it possible to set an end position for the movable wall element and to adapt therewith the opening width of the movable wall element to the task—in the case of narrow specimens, a correspondingly small opening of the weighing area suffices and the weighing area is opened wide to a larger appropriate extent only in the case of wide specimens. On the one hand, this saves time for the opening and closing and on the other hand much less air turbulence is caused in the weighing area by a slightly-opened weighing area so that the time until the subsidence of the air turbulence is also distinctly less.

The storage means preferably consists of digital electronic memories. In an advantageous embodiment the instantaneous output signal of the sensor can be stored in the memory by a control command. As a result, the wind guard can be opened e.g. manually in a learning phase to the extent intended and the control command generated in this position by actuating a key, which sets this position as the desired end position. In an advantageous further development the electronic memories have at their disposal several storage areas in which several different end positions can be stored. This results in the possibility of storing a sequence of several opening and closing processes.

In another advantageous further development switching means can be provided in the control electronics for the drive motor which means permit at least two different speeds of the drive motor and this switching means is activated as a function of the output signal of the sensor and of the stored end position. As a result thereof, the movable wall element can be moved especially rapidly and braked to a slower speed shortly before reaching the desired end position during opening or shortly before reaching the closed state during closing. This makes possible both a very rapid moving of the movable wall elements as well as a very sensitive control of the end position.

In an advantageous further development a monitoring circuit is present in the control electronics which circuit monitors the magnitude of the current through the drive motor. This monitoring circuit can serve to cut out the drive motor if the movable wall element strikes an obstacle. The monitoring circuit can also serve in the already-mentioned learning phase to recognize the closed position of the movable wall element. The movable wall element is slowly closed in the learning phase by the drive motor from the set open position until the monitoring circuit announces an excess current; this position is then the closed position. This can eliminate slight drifts in the sensor, shrinkage of the rubber seal at the stop of the movable wall element, etc. simply by a new learning phase.

In another advantageous further development an analog input device is built into the balance or connected to it by a cable. This input device can be e.g. a sliding potentiometer, mouse or joystick. The operator can then set the desired end position of the movable wall element with this input device. A digital input device can also be present in a corresponding manner.

Advantageous embodiments of the sensor result from subclaims 5 to 7.

An especially simple solution results from using a shiftable switch both as sensor and as storage means.

BRIEF DESCRIPTION OF THE INVENTION

The invention is described in the following with reference made to the schematic figures.

FIG. 5 shows a third embodiment of the balance of the invention.

DETAILED DESCRIPTION OF THE INVENTION

Figure 1:
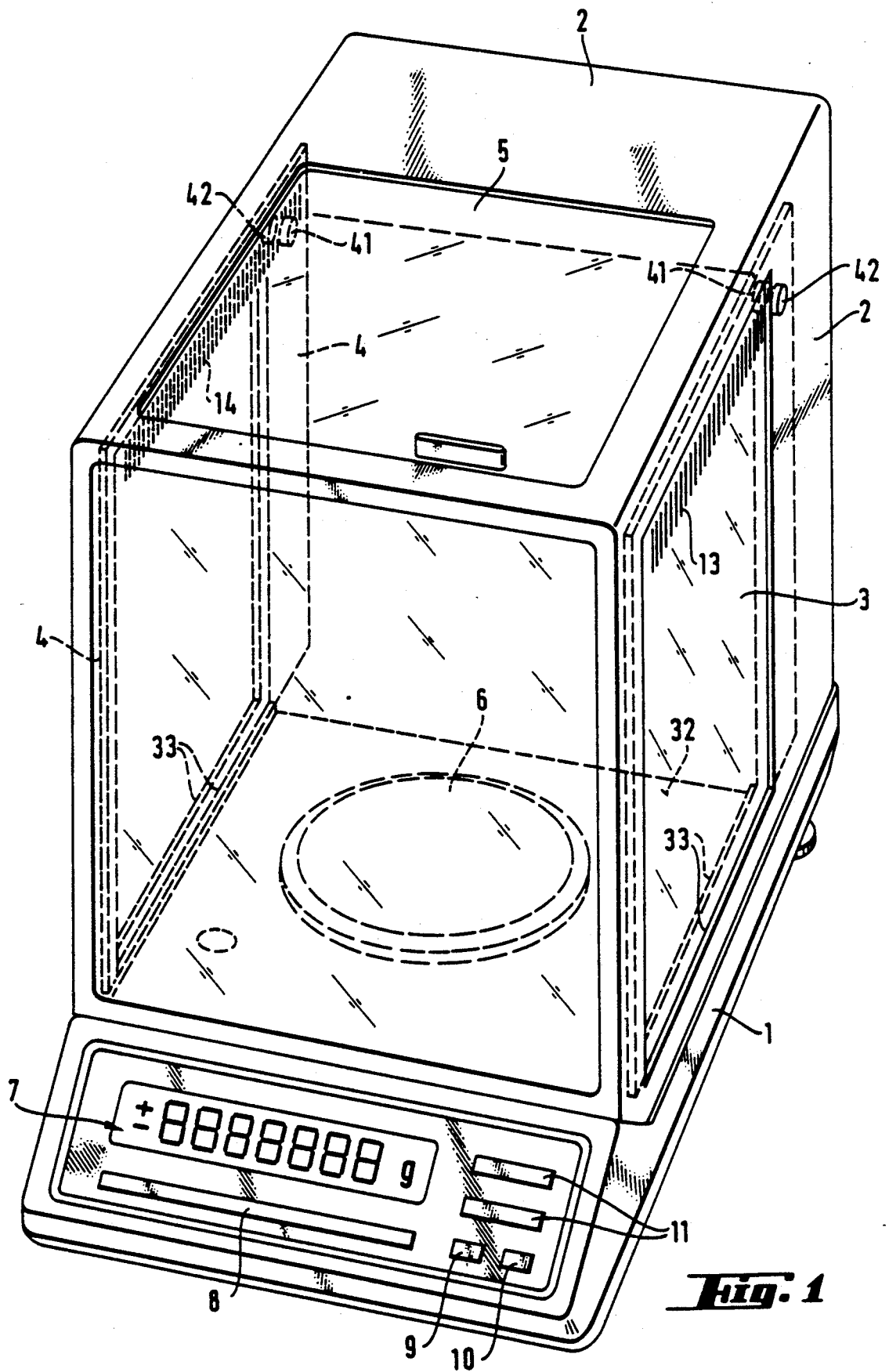
FIG. 1 shows a balance with a boxlike wind guard.

The balance in FIG. 1 consists of a lower housing part 1, a wind guard 2 with two movable side panes 3,4 and of a movable upper pane 5, as well as of a balance scale 6. The weighing result is displayed via digital display 7. Tare key 8, two keys 9,10 for the control of the motors for side panes 3,4 and other operating keys 11 for other functions such as e.g. the initiation of an expression of measured value on a separately connected printer (not shown) are present as operating elements. FIG. 1 also shows code strips 13,14 of a sensor which monitors the position of side panes 3,4.

Figure 2:
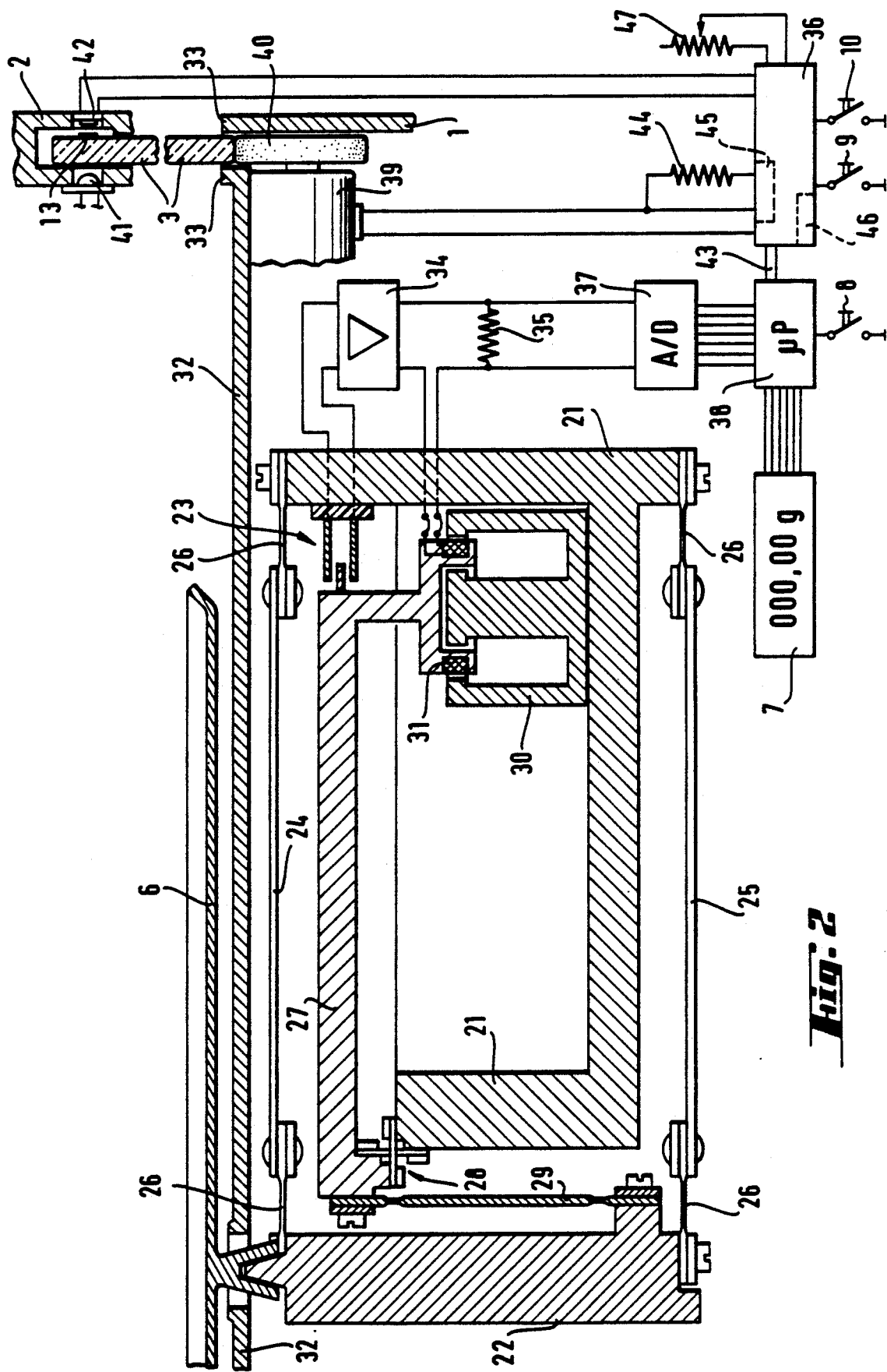
FIG. 2 shows the weighing system and the control electronics for the drive motor of the wind guard.

The operation of the balance can best be seen in FIG. 2, in which the essential mechanical and electronic parts of the balance are shown in a very simplified manner. The weighing system consists of system carrier 21, to which load receiver 22 is fastened in a vertically movable manner via two guide rods 24,25 with articulations 26. Load receiver 22 transfers the force corresponding to the mass of the material being weighed on balance scale 6 via coupling element 29 onto the load arm of translation lever 27. Translation lever 27 is mounted to system carrier 21 by means of cross spring joint 28. A coil shell with coil 31 is fastened to the compensation arm of translation lever 27. Coil 31 is located in the air gap of a permanent magnet system and generates the compensation force. The magnitude of the compensation current through coil 31 is regulated thereby in a known manner by position sensor 23 and automatic gain control amplifier 34 in such a manner that equilibrium prevails between the weight of the weighed material and the electromagnetically generated compensation force. The compensation current generates a measuring voltage on measuring resistor 35 which is fed to analog-to-digital converter 37. The digitized result is taken by digital signal processing unit 38 and digitally displayed in display 7. These parts of the weighing system of the electronic balance are generally known and were therefore described only quite briefly above.

Of the balance housing, FIG. 2 indicates only bottom sheet 32 of the weighing area, a part of lower housing part 1, a lateral part of wind guard 2 and a movable side pane 3. Side pane 3 can move in a groove formed by two projections 33 on lower housing part 1. The motor drive of side pane 3 is performed by motor 39 by means of friction wheel 40. Motor 39 is controlled thereby by control electronics 36, which is also connected to digital signal processing unit 38. The position of movable side pane 3 is sensed by a displacement sensor consisting of code strips 13 on side pane 3, light-emitting diode 41 and several optical receivers 42, only one of which is shown in FIG. 2. The function of displacement sensors with optical sensing is generally known, both as regards incrementally sensing sensors and also sensors with absolute coding, so that the details of this displacement sensor do not need to be discussed. Likewise, the motor and the displacement sensor for left side pane 4 in FIG. 1 do not need to be shown and described again since these parts are designed in the same manner as the corresponding parts shown for right side pane 3.

Control electronics 36 controls storage memory area 46 in which the desired end positions of side panes 3,4 are digitally stored. The storage of these desired end positions can be performed e.g. in a learning phase in that the balance operator moves the two side panes 3,4 by hand into the desired end position, e.g. left side pane closed, right side pane two-thirds pushed back, and then initiates a control command for storage. This control command can take place e.g. by means of actuating a separate key or by simultaneously actuating both keys 9,10. From the control command for storage, control electronics 36 reads the instantaneous output signal of the two sensors for the position of the two movable side panes 3,4 and stores this value as the desired end position memory 46. The two side panes 3,4 are subsequently slowly closed by the motor. The current required by drive motor 39 is monitored thereby by resistor 44 and threshold circuit 45 connected in downstream. During the normal motion of side pane 3 (or 4) by drive motor 39, the voltage drop on resistor 44 remains below the threshold. The current rises sharply via drive motor 39 only when side pane 3 strikes the end stop, threshold circuit 45 reacts and cuts out drive motor 39. At the same time, the instantaneous output signal from displacement sensor 13/41/42 is read and stored as value for the closed side pane. Thus, the "closed" position of the side pane is also checked at the end of each learning phase and stored anew. This achieves the result that the side panes always close correctly independently of any changes to construction components.

If key 9 for "opening of the wind guard" is subsequently pressed, then the two side panes 3,4 open up to the position preprogrammed in the learning phase—thus, in the example given above the left side pane remains closed and the right side pane opens up to two thirds of its maximum opening. To this end, control electronics 36 constantly compares the actual position of side pane 3 announced from displacement sensor 13/41/42 with the stored, desired end position and stops motor 39 as soon as both values coincide.

Advantageous embodiments of this sketched operating sequence can be readily performed by any one skilled in the art. For example, the motor can have two different speeds and control electronics 36 can switch to the lower speed shortly before reaching the desired end position or shortly before reaching the closed state of the wind guard. This means that the displacement speed for the side panes can be selected to be very high without any danger that the side pane will strike vigorously against the end stop. Or, the displacement speed is continuously increased at the start of the motion and gently braked at the end of the motion. Or, the lagging of the motor is compensated by an appropriately earlier cutting off of the motor. All these embodiments are possible due to the inclusion in accordance with the invention of the displacement sensor and due to the storage of the desired end position.

An automatic operation is also possible in that the command for opening the wind guard is given e.g. immediately after the standstill of the balance. To this end, there is a connection 43 between digital signal processing unit 38 and control electronics 36. The standstill signal of digital signal processing unit 38 then initiates the opening of the wind guard up to the desired position; the operator then only has to remove the material being weighed, put in new material to be weighed and actuate key 10 for the closing of the wind guard. The weighing, storage of measured value and the subsequent opening up to the desired end position then occur automatically.

The new determination of the "closed" position of the side panes in each learning phase described above can also achieve the special requirement of not quite closing one or both side panes. To this end, a small obstacle is put in during the learning phase shortly before the closed position and the balance recognizes through the current-monitoring circuit when the side pane strikes this obstacle as an apparent "closed" position and stores this position.

If digital electronic memories 46 exhibit sufficient storage capacity, then several desired end positions can also be stored, e.g. "$\frac{1}{4}$ open" and "$\frac{3}{4}$ open". These preprogrammed end positions can either be called up by different actuating keys or also be started automatically in a programmed cycle, e.g. the cycle: closed—$\frac{3}{4}$ open (insert tare vessel)—closed—$\frac{1}{4}$ open (dose first component)—closed—$\frac{1}{4}$ open (dose second component)—closed—$\frac{3}{4}$ open (remove vessel)—closed—etc.

In a further embodiment an analog input device is connected to the balance, sketched in FIG. 2 as sliding potentio-meter 47. The magnitude of the desired opening can be set in an analog manner by the operator on this input device e.g. in the learning phase. It is also possible, for example, to set the particular desired motion of the movable side pane in an analog manner with this input device and to allow the side pane to follow this theoretical value.

A digital setting, e.g. by means of a higher-ranking control computer, is also possible in a corresponding manner.

Figure 3:
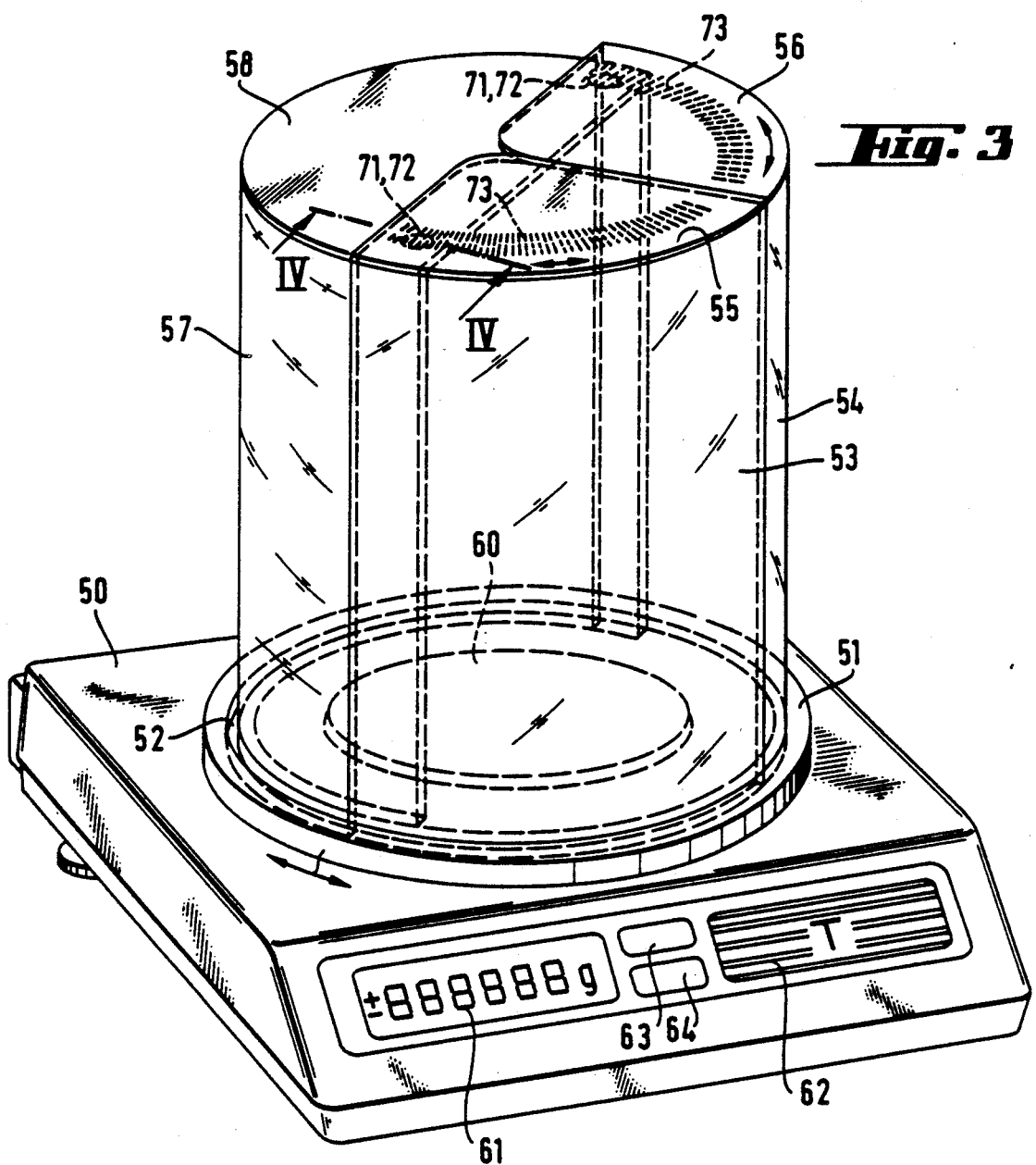
FIG. 3 shows a balance with cylindrical wind guard.

FIG. 3 shows another embodiment of the balance with a cylindrical wind guard. A ring 51 is rotatably mounted on lower housing part 50, in which ring the two panes 53,54 of the wind guard are mounted so that they can shift in grooves 52. The rear area 57 of the wind guard and cover area 58 fixed to it are fastened permanently to ring 51. The two panes 53,54 with cover areas 55,56 fastened to them can be opened and closed by a motor (not shown). The transfer of force takes place e.g. as in the embodiment according to FIGS. 1 and 2 via a friction wheel. The sensor for sensing the position of the two movable panes 53,54 is concealed in cover area 55/56/58 and is described below with reference made to FIG. 4. The operator can rotate the slot between panes 53 and 54 into the desired position by rotating ring 51 and then set the desired degree of opening of the two panes 53,54 of the wind guard in a learning phase in the manner already described.

FIG. 3 also shows balance scale 60, display 61, tare key 62 and the two keys 63,64 for starting the motor-driven opening and closing of the weighing area.

Figure 4:
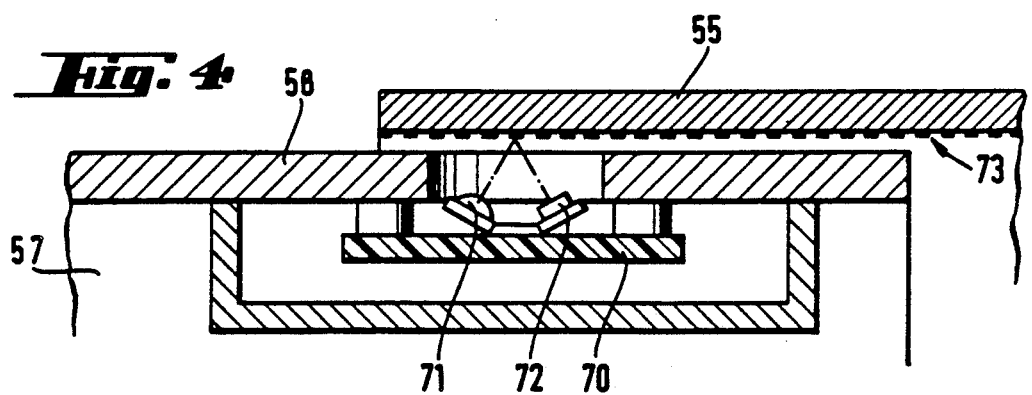
FIG. 4 shows the sensor for the position of the movable wall elements of the wind guard of FIG. 3.

FIG. 4 shows the angle sensor which monitors the position of pane 53 in a more detailed fashion. Light-emitting diode 71 and several photoreceivers 72, only one of which is shown, are attached on stationary cover 58 to plate 70. The light-emitting diode and the photoreceivers are arranged in such a manner relative to each other and inclined in such a manner that the light of the light-emitting diode is reflected back onto photoreceiver 72 if the underside of cover area 55 connected to movable pane 53 is designed to be metallically reflecting. The for example incremental code 73 for the position sensor is produced with a dark color or by means of dully etching the otherwise polished underside of cover area 55. When cover area 55 is rotated, the photoreceiver is therefore illuminated to a greater and a lesser degree in an alternating fashion, which produces the output signal for the control electronics. The control electronics itself is designed as in the first embodiment.

The optically sensing sensors described above can of course also be replaced by inductive, capacitive, magnetic, ultrasound or other sensors without departing from the concept of the invention.

FIG. 5 shows a third, especially simple embodiment of the balance. The parts designated with reference numbers 1 to 11 are identical to the corresponding parts in FIG. 1 and therefore do not need to be explained again. Sensor 80 for monitoring the position of pane 3 consists in this embodiment of an electric switch, which changes its switching state as soon as the upper edge 83 of pane 3 no longer presses it upward. Sensor 80 can be shifted manually in a guide 84 on upper side wall 82 of wind guard 2; the desired end position for side pane 3 is stored by means of the position of this switching sensor 80. The operator must therefore set the desired end position for the right pane by shifting switching sensors 80. The initiation of the opening process then takes place by means of the actuation of key 9. The drive motor for pane 3 stops as soon as switching sensor 80 changes its switching state. The setting of the desired opening and the monitoring of the left pane 4 take place in the same manner by means of a corresponding switching sensor 81.

What is claimed is:

1. In a balance with a balance scale (6,60), with a weighing area which surrounds the balance scale (6,60) on all sides and which can be opened and closed at least one position by shifting a movable wall means (3,4,53,54), with a drive motor (39) for shifting the movable wall element (3,4,53,54) and with control electronics (36) for the drive motor (39), comprising a sensor (13/41/42, 14, 71/72/73, 80, 81) which monitors the position of the movable wall means (3,4,53,54) whereby the output signal of the sensor (13/41/42, 14, 71/72/73, 80, 81) is fed to control electronics (36) for the drive motor (39) and storage means (46,80,81) in which a desired end position for the movable wall element (3,4,53,54) is stored.

2. The balance according to claim 1, wherein the storage means includes digital electronic memories (46).

3. The balance according to claim 2, wherein the output signal of the sensor (13/41/42, 14, 71/72/73) is stored in the digital electronic memories (46) by means of a control command.

4. The balance according to either of claims 1 or 2, wherein the digital electronic memories (46) have many memory locations available that several end positions can be stored.

5. The balance according to claim 1, wherein the sensor (13/41/42, 14) is a displacement sensor which monitors the position of the movable wall element (3,4).

6. The balance according to claim 1, wherein the movable wall is a cylindrical wind guard and the sensor is an angle sensor (71/72/73) which monitors the position of the movable wall (53,54).

7. The balance according to either of claims 1 or 6, wherein an incremental sensor (13/41/42, 14, 71/72/73) is used.

8. The balance according to claim 1, wherein switching means are present in the control electronics (36) for the drive motor (39) which means permit at least two different speeds of the drive motor (39) and that this switching means is activated as a function of the output signal of the sensor (13/41/42, 14, 71/72/73) and of the stored end position.

9. The balance according to claim 1, wherein a monitoring circuit (44/45) is present in the control electronics (36) which circuit monitors the magnitude of the current through the drive motor (39).

10. The balance according to claim 1, wherein an analog input device (47) is connected to the balance with which input device the desired position of the movable wall means (3,4,53,54) can be set by the operator.

11. The balance according to claim 1, wherein a digital input device is present by means of which the desired position of the movable wall means (3,4,53,54) is set.

12. The balance according to claim 1, wherein a movable shiftable switch (80, 81) is used as sensor.

* * * * *